(12) United States Patent
St-Pierre

(10) Patent No.: US 7,331,555 B2
(45) Date of Patent: Feb. 19, 2008

(54) RECESSED ELECTRICAL EQUIPMENT FIXTURE

(75) Inventor: Guy St-Pierre, Brossard (CA)

(73) Assignee: Les Luminaires Eureka Lighting, Montreal, Quebec (CA)

( * ) Notice: Subject to any disclaimer, the term of this patent is extended or adjusted under 35 U.S.C. 154(b) by 41 days.

(21) Appl. No.: 10/989,906

(22) Filed: Nov. 17, 2004

(65) Prior Publication Data

US 2005/0258326 A1    Nov. 24, 2005

Related U.S. Application Data

(60) Provisional application No. 60/571,924, filed on May 18, 2004.

(51) Int. Cl.
*B42F 13/00* (2006.01)
(52) U.S. Cl. .................. 248/343; 248/906; 248/342; 248/300; 248/309.1; 174/503; 220/3.2; 220/3.5; 220/3.7
(58) Field of Classification Search ................ 248/906, 248/342, 343, 300, 309.1; 174/503; 220/3.2, 220/3.5, 3.7
See application file for complete search history.

(56) References Cited

U.S. PATENT DOCUMENTS

| | | | | |
|---|---|---|---|---|
| 2,063,923 A | * | 12/1936 | Gries ..................... 220/3.6 |
| 2,965,348 A | * | 12/1960 | Gerstel et al. .............. 248/343 |
| 3,620,401 A | * | 11/1971 | Lund .......................... 220/3.6 |
| 3,748,460 A | | 7/1973 | Price |
| 4,250,540 A | * | 2/1981 | Kristofek ..................... 362/368 |
| 4,293,895 A | * | 10/1981 | Kristofek ..................... 362/147 |
| 4,431,151 A | * | 2/1984 | Schonasky ................. 248/27.1 |
| 4,733,339 A | * | 3/1988 | Kelsall ........................ 362/366 |
| 5,068,772 A | * | 11/1991 | Shapiro et al. ............. 362/365 |
| 5,264,994 A | * | 11/1993 | Choi ........................... 362/148 |
| 5,314,148 A | * | 5/1994 | Jones ......................... 248/27.3 |
| 5,377,088 A | * | 12/1994 | Lecluze ..................... 362/366 |
| 5,609,414 A | * | 3/1997 | Caluori ...................... 362/366 |
| 5,826,970 A | | 10/1998 | Keller et al. |
| 5,931,432 A | * | 8/1999 | Herold et al. .............. 248/343 |
| 5,941,625 A | * | 8/1999 | Morand ..................... 362/148 |
| 6,364,512 B1 | | 4/2002 | Logel |
| 6,505,960 B2 | | 1/2003 | Schubert et al. |
| 6,554,458 B1 | * | 4/2003 | Benghozi .................... 362/365 |
| 6,827,471 B1 | * | 12/2004 | Benghozi .................... 362/365 |
| 2003/0223240 A1 | | 12/2003 | Houle |

\* cited by examiner

*Primary Examiner*—Carl D. Friedman
*Assistant Examiner*—Michael McDuffie
(74) *Attorney, Agent, or Firm*—Venable LLP; Robert Kinberg; Ryan M. Flandro

(57) ABSTRACT

A recessed fixture for mounting into an opening in a wall structure defining front and rear wall surfaces comprises a pot defining a fixture chamber to be received in the opening of the wall structure and having a peripheral wall, an end wall and a peripheral flange for abutment with the wall structure. A clip is provided having a surface-abutting portion. The clip is so mounted to the peripheral wall of the pot so as to reciprocate between a retracted position where the clip is inside the fixture chamber and an extended position where the surface-abutting portion is outside the fixture chamber and abuts the rear surface of the wall structure. A fastener is coupled to both the clip and the pot for reciprocatively moving the clip between retracted and extended positions.

19 Claims, 8 Drawing Sheets

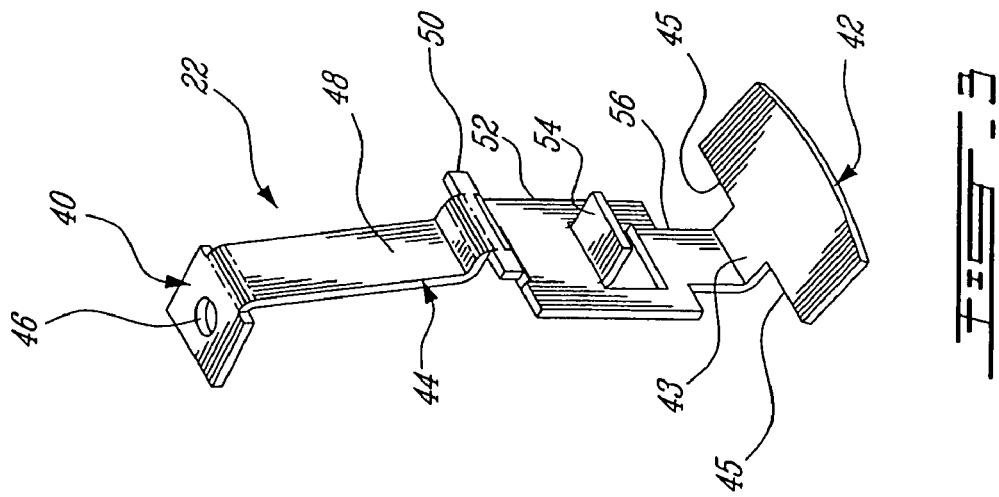
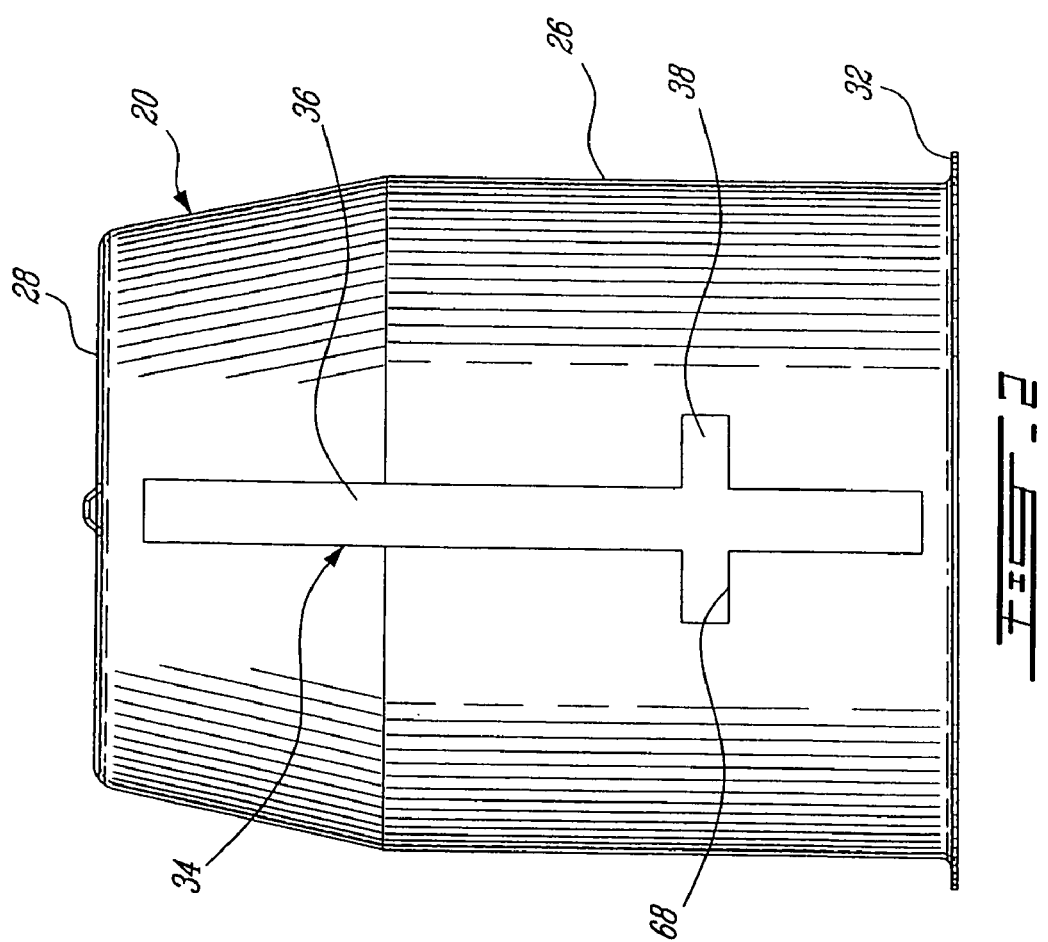

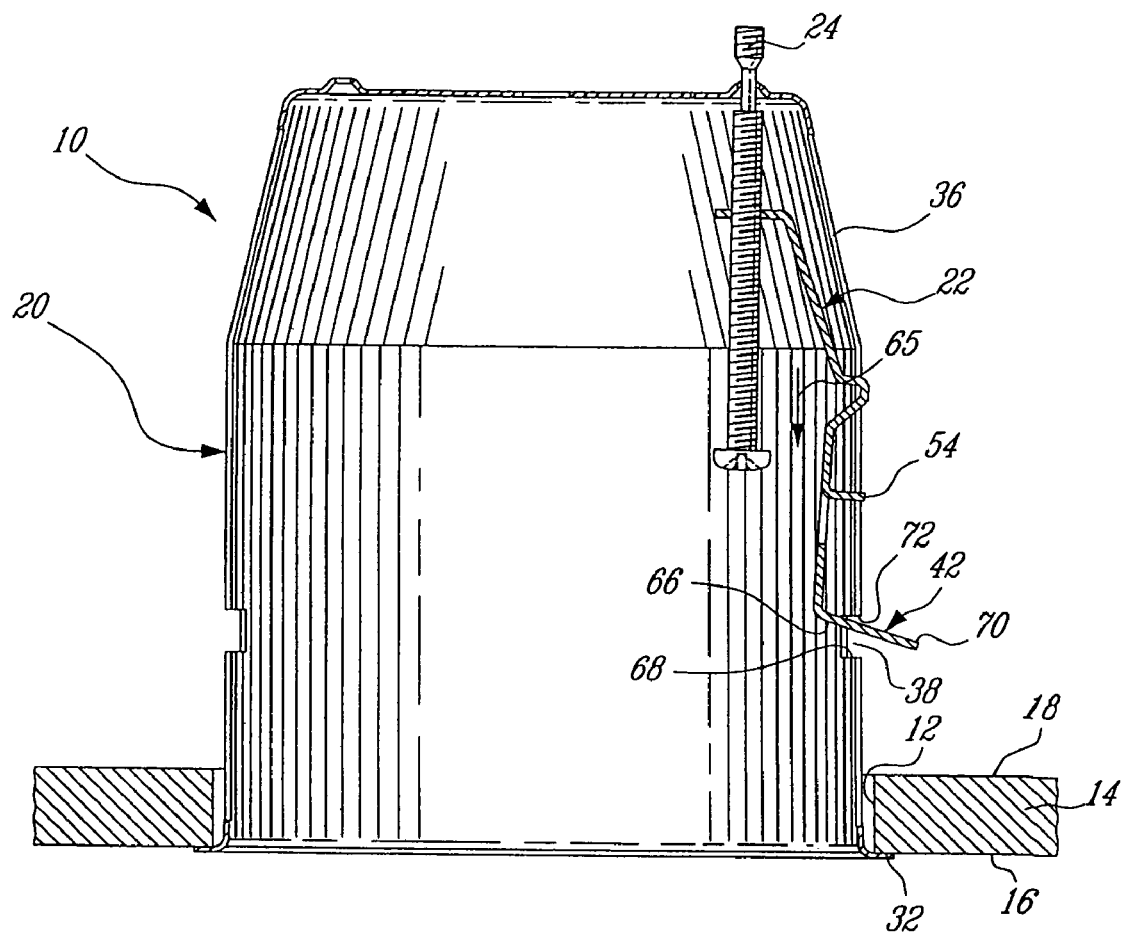
FIG_4

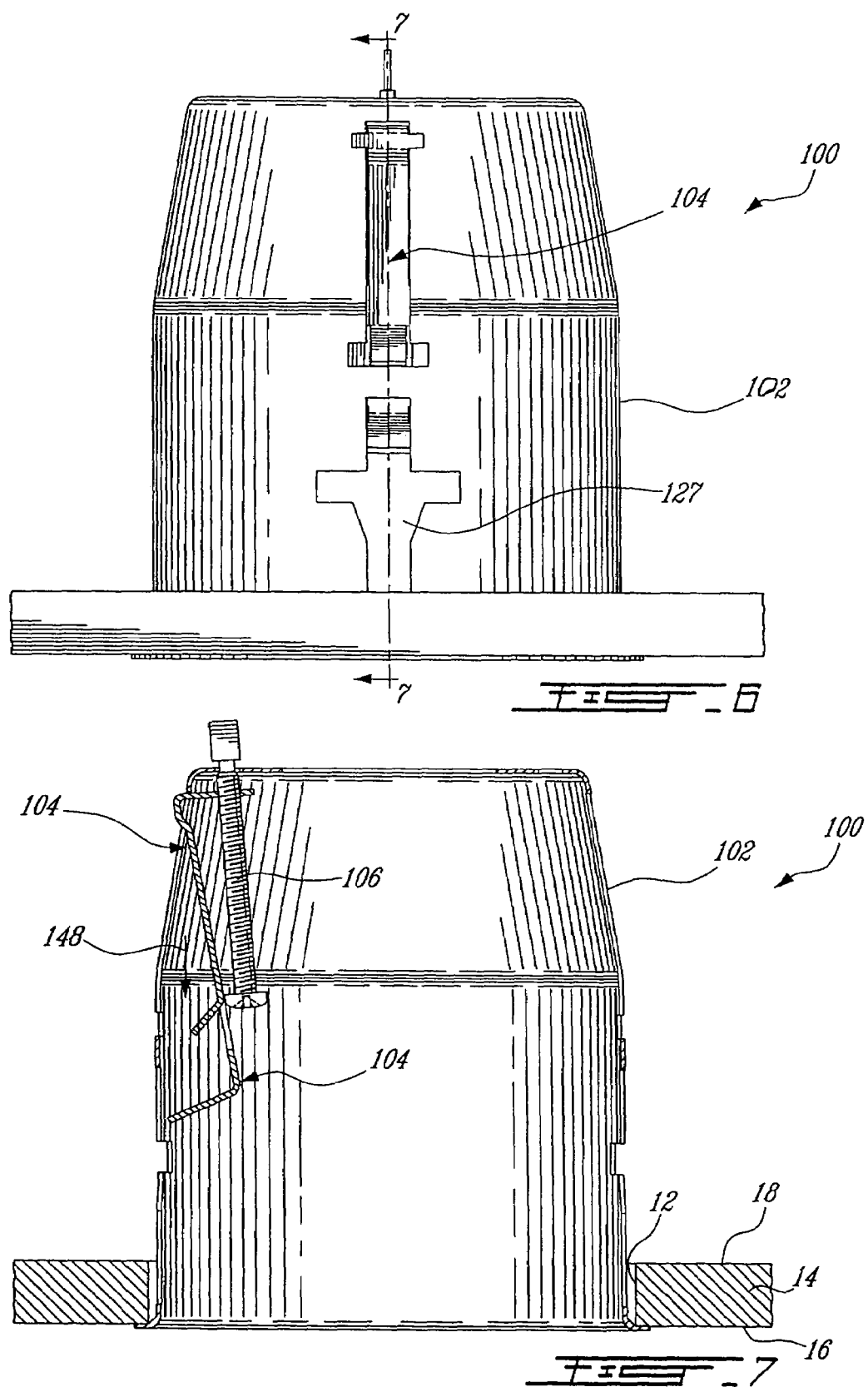

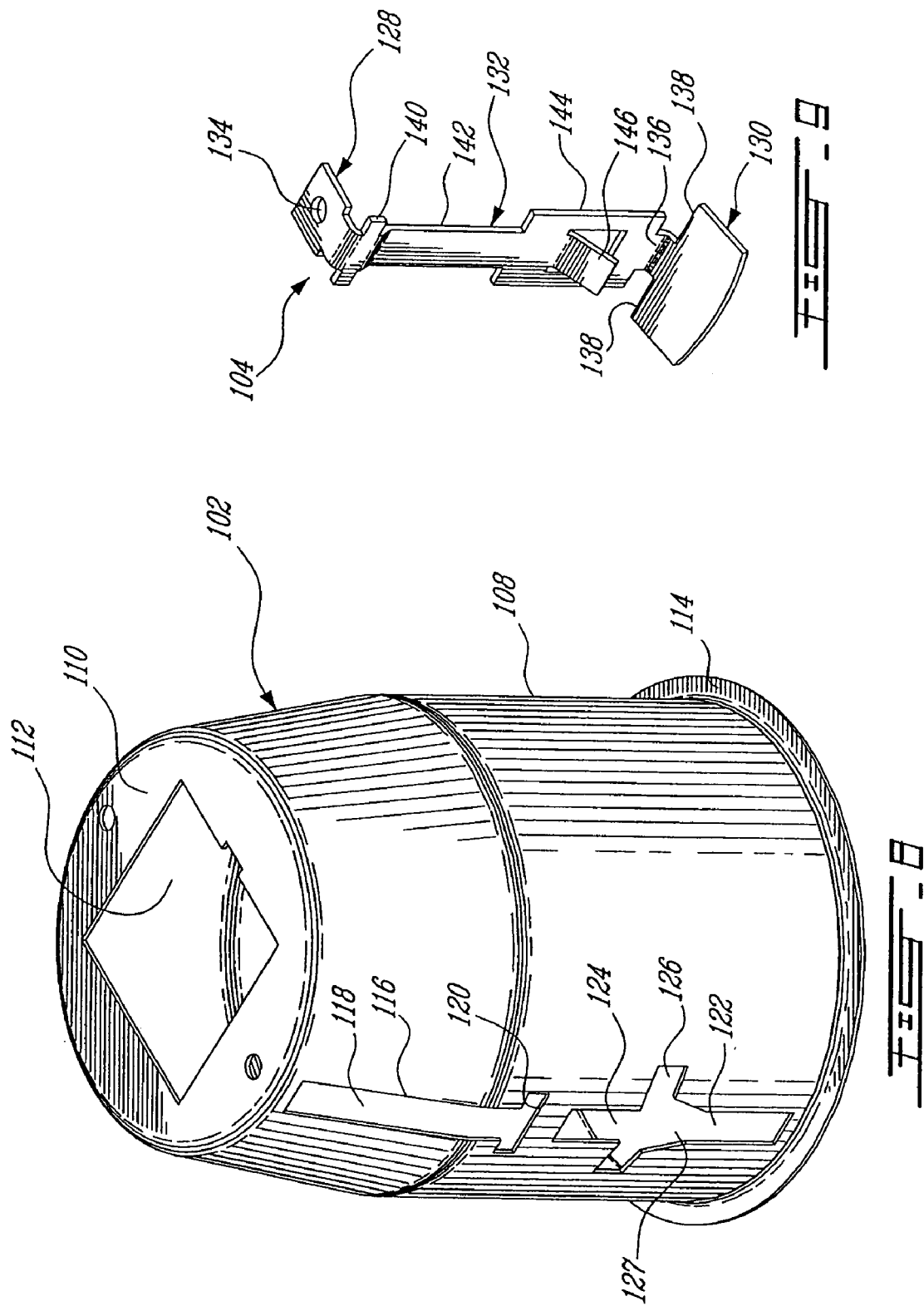

RECESSED ELECTRICAL EQUIPMENT FIXTURE

CROSS-REFERENCE TO RELATED APPLICATION

This application claims the priority of U.S. Provisional Application No. 60/571,924 filed May 18, 2004, the subject matter of which is incorporated herein by reference.

FIELD OF THE INVENTION

The present invention generally relates to recessed electrical equipment, such as, amongst others, light fixtures. More specifically, the present invention is concerned with a recessed electrical equipment fixture of the type having retaining clips for securing the fixture to a ceiling or to a wall surface.

BACKGROUND OF THE INVENTION

Recessed fixtures usually comprise a pot having a peripheral wall and a peripheral outer flange extending from the open end of the pot and which is so configured as to bear against the front surface of a ceiling. Clips are usually provided to secure the pot to a ceiling or wall surface. These clips generally extend from openings in the peripheral wall and are adjustably mounted to the pot through a fastener. More specifically, each clip is provided with a portion configured and sized to bear on the rear surface of the ceiling.

An example of such a recessed light fixture is disclosed in U.S. Pat. No. 5,377,088 issued to Lecluze on Dec. 27, 1994 and titled "Light Fixture for Mounting to a Ceiling, Wall or the Like". A first drawback of Lecluze's fixture is that it requires three steps to install: 1) mounting the clip to the pot, 2) to position correctly the clip in the openings in the peripheral wall of the pot, and then 3) to rotate the fastener until an abutting portion of the clip abuts the rear surface of the ceiling or wall. Moreover, the clip is not configured to cooperate with the pot so as to be fixedly secured thereto before installation of the fixture. Lecluze's fixture is not designed so as to be easily unclipped, for example after an unsuccessful mounting attempt or should it be necessary to remove it for any reason. Finally, the projection of the screw outwardly from the can towards in the ceiling or the like increases the minimum cavity height required for installation.

Another example of recessed fixture is disclosed by Benghozi in the U.S. Pat. No. 6,554,458, issued on Apr. 29, 2003 and titled "Recessed Light Fixture". Even though Benghozi's clip is fixedly secured to the pot and that it requires only two steps to install, it is not so designed as to be easily unclipped, for example after an unsuccessful mounting attempt or should it be necessary to remove it for any reason. Furthermore, the clip of Benghozi fixture is provided outside the pot when it is in a retracted position and may therefore be easily damaged during transport or installation. Finally, since the clip has to be flexible to operate, it is not sufficiently stiff for some applications, where, for example, heavy charges are supported.

OBJECTS OF THE INVENTION

An object of the present invention is therefore to provide an improved recessed electrical equipment fixture.

SUMMARY OF THE INVENTION

More specifically, in accordance with a first aspect of the present invention, there is provided a clip for mounting a pot into an opening in a wall structure defining front and rear wall surfaces, the pot being provided with a peripheral wall, an end wall at one longitudinal end of the peripheral wall, and a peripheral flange at the other end thereof for abutment with the front wall surface of the wall structure, the peripheral wall including a generally transversal slot and a generally longitudinal slot extending between the end wall and the peripheral flange and defining a longitudinal axis intersecting the transversal slot, the clip comprising: a body having a first longitudinal end defining a fastener-receiving portion for receiving a fastener to be secured to the end wall of the pot, a second longitudinal end defining a surface-abutting portion and a clip-mounting portion protruding from the body between the first and second longitudinal ends for slidably mounting the clip to the peripheral wall of the pot via the generally longitudinal slot so as to be reciprocately movable between a first position where the surface-abutting portion is at least partially included within the pot and a second position where the surface-abutting portion extends completely from the generally transversal slot out of the pot; wherein, in operation, reciprocal movement of the clip between the first and second position is solely caused by the rotation of the fastener.

According to a second aspect of the present invention, there is provided a recessed fixture for mounting into an opening in a wall structure defining front and rear wall surfaces, the fixture comprising: a pot adapted to be received in the opening of the wall structure and having a peripheral wall, an end wall at one longitudinal end of the peripheral wall, and a peripheral flange at the other end thereof for abutment with the front wall surface of the wall structure; the pot defining a fixture chamber; a clip having a surface-abutting portion for abutting the rear surface of the wall; the clip being movably mounted to the peripheral wall of the pot so as to reciprocate between a retracted position where the clip is located inside the fixture chamber and a clipping position where the surface-abutting portion is located outside the fixture chamber and abuts the rear surface of the wall structure when the pot is received in the opening of the wall structure and the peripheral flange contacts the front surface of the wall structure; and a clip actuator coupled to both the clip and the pot for reciprocatively moving the clip between the retracted position and the clipping position.

According to a third aspect of the present invention, there is provided a recessed fixture for mounting into an opening in a wall structure defining front and rear wall surfaces, the fixture comprising: a pot adapted to be received in the opening of the wall structure and having a peripheral wall, an end wall at one longitudinal end of the peripheral wall, and a peripheral flange at the other end thereof for abutment with the front wall surface of the wall structure; the pot defining a fixture chamber; a clip having a surface-abutting portion for abutting the rear surface of the wall; the clip being movably mounted to the peripheral wall of the pot so as to reciprocate between a retracted position where the surface-abutting portion is located inside the fixture chamber and a clipping position where the surface-abutting portion is located outside the fixture chamber and abuts the rear surface of the wall structure when the pot is received in the opening of the wall structure and the peripheral flange contacts the front surface of the wall structure; and a clip actuator to reciprocatively move the clip between the retracted position and the clipping position.

According to a fourth aspect of the present invention, there is provided a recessed fixture for mounting into an opening in a wall structure defining front and rear wall surfaces, the fixture comprising: a pot adapted to be received in the opening of the wall structure and having a peripheral wall, an end wall at one longitudinal end of the peripheral wall, and a peripheral flange at the other end thereof for abutment with the front wall surface of the wall structure; the pot defining a fixture chamber; a clip having a fastener-receiving portion, a surface-abutting portion and an intermediate portion provided between the fastener-receiving portion and the surface-abutting portion; the intermediate portion being mounted to the peripheral wall inside the fixture chamber so as to allow the clip to reciprocate between a retracted position and a clipping position; and a fastener to be mounted between the pot and the clip to reciprocatively move the clip between the retracted position and the clipping position.

Finally, in accordance to a fifth aspect of the present invention, there is provided a recessed fixture for mounting into an opening in a wall structure defining front and rear wall surfaces, the fixture comprising: a pot adapted to be received in the opening of the wall structure and having a peripheral wall, an end wall at one longitudinal end of the peripheral wall, and a peripheral flange at the other end thereof for abutment with the front wall surface of the wall structure; the pot defining a fixture chamber; a clip having a surface-abutting portion for abutting the rear surface of the wall; the clip being movably mounted to the peripheral wall of the pot so as to reciprocate between a retracted position and a clipping position; the surface-abutting portion being located outside the fixture chamber and is so configured as to be deflectable inside the fixture chamber to allow insertion of the recessed fixture into the wall opening; and a clip actuator for reciprocatively moving the clip between the retracted position and the clipping position.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2 is a cross-section of the pot part of the recessed fixture of FIG. 1;

FIG. 3 is a perspective view of a clip part of the recessed fixture of FIG. 1;

FIG. 4 is a cross-section of the recessed fixture of FIG. 1, illustrating the clip partially extended;

FIG. 6 is a front elevation of a recessed fixture according to a second illustrative embodiment of the present invention, illustrating the clip retracted;

FIG. 7 is a cross-section taken along line 7-7 on FIG. 6;

FIG. 8 is a perspective view of the pot part of the recessed fixture of FIG. 6;

FIG. 9 is a perspective view of the clip part of the recessed fixture of FIG. 6;

DETAILED DESCRIPTION

Figure 1:
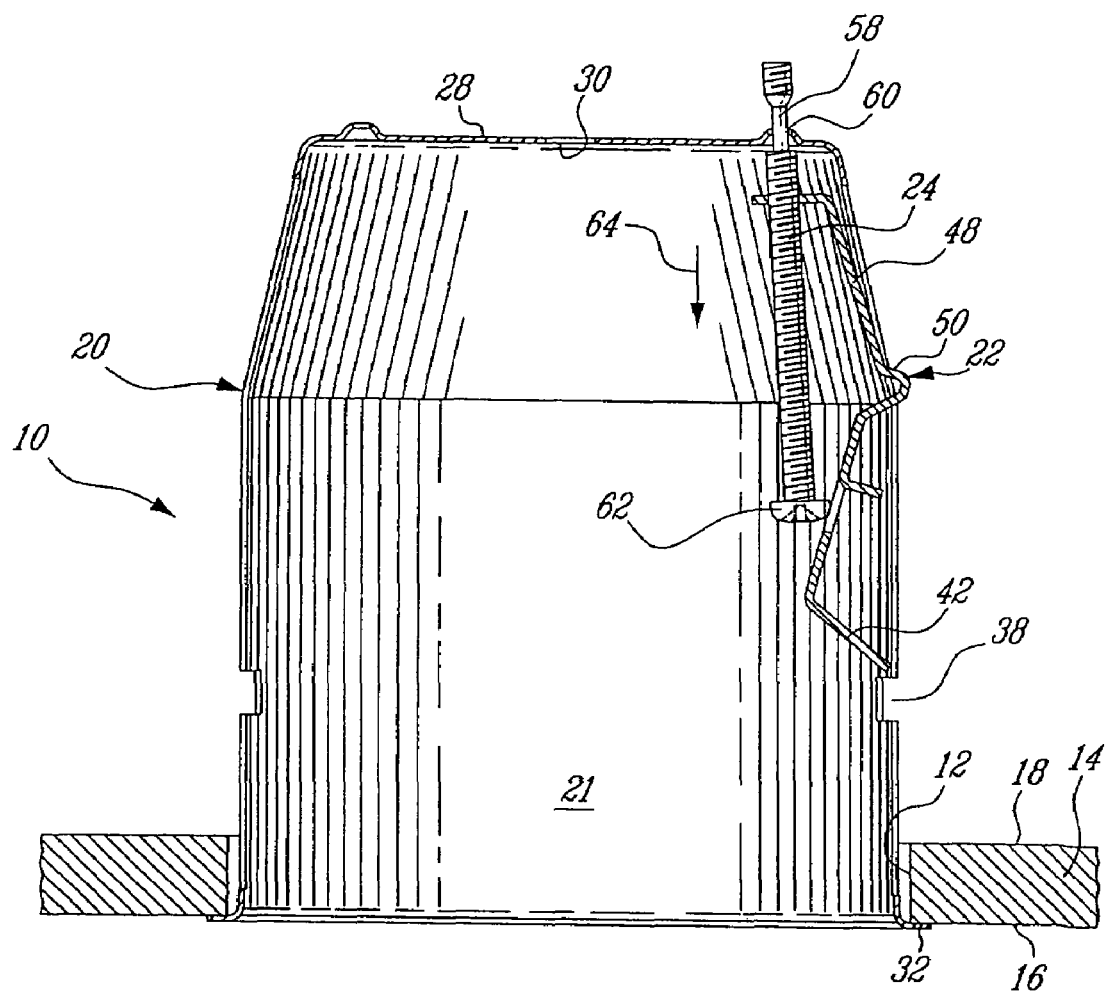
FIG. 1 is a cross-section of a recessed fixture according to a first illustrative embodiment of the present invention, illustrating the clip fully retracted.

A recessed fixture 10 according to a first illustrative embodiment of the present invention will now be described with reference to FIGS. 1 to 5.

The fixture 10 is for mounting into an opening 12 in a wall structure 14 defining front and rear wall surfaces 16 and 18.

The fixture 10 comprises a pot 20 so configured and sized as to be inserted in the opening 12 of the wall structure 14, two clips 22 (only one shown) for securing the pot 20 to the wall structure 14 within the opening 12, and two fasteners 24 (only one shown) for securing the clips 22 to the pot 20 and for acting thereon.

Turning now to FIG. 2, the pot 20 has a generally cylindrical shape defined by a peripheral wall 26, and includes an end wall 28 at one longitudinal end of the peripheral wall 26. The peripheral wall 26 is tapered near the end wall 28 so as to ease the insertion of the pot 20 into the opening 12. The pot 20 thereby defines an open fixture chamber 21.

The end wall 28 is provided with an opening 30 for receiving electrical components allowing for example a light bulb (not shown) to be mounted and connected therein. The peripheral wall 26 may also be provided with such openings (not shown).

The pot 20 further comprises a peripheral flange 32 at the longitudinal end of the peripheral wall opposite the end wall 28. The flange 32 prevents the complete insertion of the pot 20 in the opening 12 since it is larger than the opening 12 and therefore abuts the front wall surface 16. The flange 32 further allows the pot 20 to be secured to the wall structure 14 in cooperation with the clip 22 as will be described hereinbelow. The width of the flange 32 may of course vary.

The pot 20 may have other configuration without departing from the spirit and nature of the present invention. For example, the peripheral wall 26 may define a rectangular cross-section.

As can be better seen in FIG. 2, the peripheral wall 26 of the pot 20 includes a pair of diametrically opposed cross-shaped slots 34 (only one shown), each including a generally longitudinally aligned slot 36, extending between the vicinity of the end wall 28 and the vicinity of the peripheral flange 32, and a transversal slot 38 perpendicularly intersecting the longitudinally aligned slot 36. As will be explained hereinbelow in more detail, the longitudinal slot 36 defines a clip-receiving means. The configuration of the longitudinal slot 36, including its length and width may vary, depending on the configuration of the clip 22, as will also be explained hereinbelow in more detail.

Turning now more specifically to FIG. 3, the clip 22 will described in more detail.

The clip 22 is in the form of a bended generally flat elongated body including a fastener-receiving portion 40, a surface-abutting portion 42 and an intermediate portion in the form of a clip-mounting portion 44 for slidably mounting the clip 22 to the peripheral surface 26 of the pot 20 via the slot 36.

The fastener-receiving portion 40 includes a threaded aperture 46 configured to threadingly receive the fastener 24.

The surface-abutting portion 42 is generally flat and defines an obtuse angle with respect to the intermediate portion 44. It includes a narrower section 43 and two shoulders 45.

The intermediate portion 44 includes a narrow section 48 adjacent to the fastener-receiving portion 40, a clip mounting portion in the form of a generally T-shaped section 50 adjacent to the narrow portion 48, a wide section 52 provided with a folded tab 54 and located adjacent to the T-shaped section 50 and a connecting section 56 located between the wide section 52 and the surface-abutting portion 42.

The fastener 24 includes a first end 58 that is devoid of threads and is inserted in an aperture 60 of the end wall 28. The fastener 24 is therefore free to rotate in the aperture 60 without longitudinal movements therein. The second end 62 of the fastener 24 may be conventionally engaged by a screwdriver (not shown) to impart a rotating movement thereof.

Returning to FIG. 1, when the clip 22 is mounted to the pot 20 via the fastener 24, the narrow section 48 is always inside the pot 20 while the wider portion of the T-shaped section 50 is always outside the pot 20. The clip 22 is therefore mounted to the pot 20 both by the fastener 24 and by the frictional connection of the T-shape section 50 and the external surface of the pot 20 on each side of the slot 36.

In operation, when the clip 22 is in a fully retracted position as illustrated in FIG. 1, the surface-abutting portion 42 is fully enclosed in the fixture chamber 21 of the pot 20 and contacts the inner surface of the pot 20. Accordingly, the three points of contact between the clip 22 and the pot 20 creates a biasing force that tries to push the surface-abutting end 42 outwardly. Also, this biasing force allows preventing movement of the clip 22 when it is completely comprised within the pot 20, which can be advantageous during shipping for example.

When the fastener 24 is rotated in a clockwise direction, it forces the clip 22 towards its extended position (see arrow 64). As can be seen from FIG. 4, the movement of the clip 22 aligns the surface-abutting portion 42 with the transversal slot 38 which is configured and sized as to allow its passage therethrough. Accordingly, the biasing force described hereinabove forces the portion 42 outwardly. As can also be seen from FIG. 4, the folded tab 54 rides in the longitudinal slot 36 to help the clip 22 to maintain its longitudinal attitude.

The fastener 24 is further rotated to bring the surface-abutting portion 42 in contact with the rear surface 18 of the wall 14. Indeed, as mentioned hereinabove, the clockwise rotation of the fastener 24 forces the clip 22 in the direction of arrow 65. This movement forces the surface-abutting portion 42 outwardly since its angled underside 66 eventually contacts the edge 68 of the aperture 38 until the narrow section 43 enters the longitudinal slot 34 and the shoulders 45 abut the outside surface of the pot 20 on either sides of the slot 36.

Figure 5:
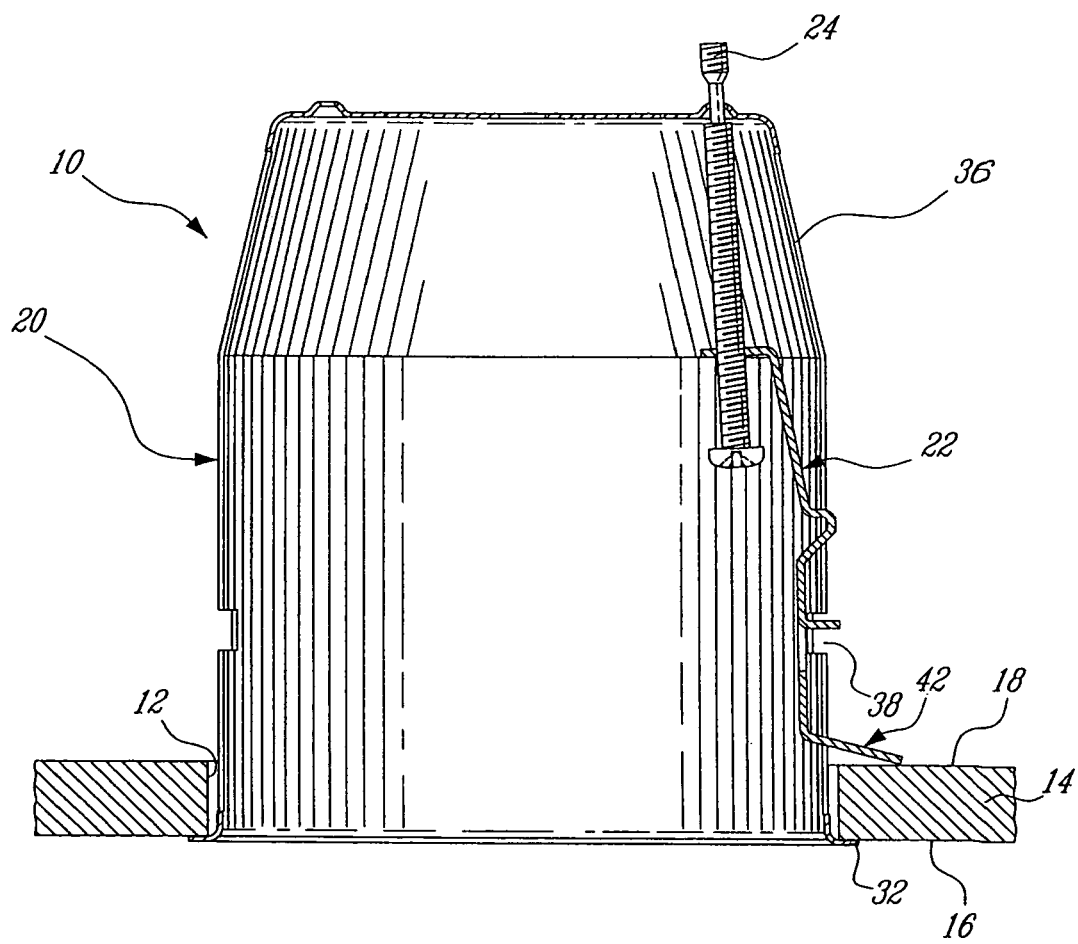
FIG. 5 is a cross-section of the recessed fixture of FIG. 1, illustrating the clip fully extended.

FIG. 5 illustrate the clip 22 in its fully extended position where the surface-abutting portion 42 abuts the rear surface 18 of the wall 14 to thereby sandwich the wall 14 between the flange 32 and the portion 42.

One skilled in the art will appreciate that the movement of the clip 22 from its fully retracted position illustrated in FIG. 1 to its fully extended position illustrated in FIG. 5 can be achieved solely by the use of the fastener 24. Furthermore, should the fastener 24 be rotated in a counter-clockwise direction, the clip 22 would move back to its fully retracted position where the surface-abutting portion 42 is located inside the pot 20, allowing the removal of the pot 20 from the aperture 12. Indeed, during this movement of the clip 22 towards its retracted position, the top surface 70 of the surface-abutting portion 42 eventually contacts the edge 72 of the slot 38 to guide the surface-abutting portion 42 inside the fixture chamber 21.

Of course, the number and position of cross-shapes slots 34 may vary. Accordingly, the number of clips 22 mounted to the pot 20 may also vary.

It is also to be noted that the angle of the surface-abutting portion 42 with respect to a longitudinal direction of the pot 20 and the resilient nature of the clip 22 allows the pot 20 to be mounted to the aperture 10 even should the surface-abutting portion 42 be partially extended, for example as illustrated in FIG. 4. Indeed, should the pot 20 be inserted in the aperture 12 when in that state, the surface-abutting portion 42 would momentarily deflect inside the fixture chamber 21 and then resume its initial configuration. Therefore, mounting the pot 20 to the aperture 10 while the surface-abutting portion 42 is initially partially extended as illustrated in FIG. 4 also allows first securing the pot 20 within the aperture 12 before positioning the clip 22 in the clipping configuration illustrated in FIG. 5. It is to be appreciated that the clipping step then only requires the use of one hand since the pot 20 is prevented from falling from the opening 12 by the surface-abutting portion 42 which has returned to its partially extended initial configuration as soon as it is translated beyond the wall structure 14. In this configuration, pulling the pot 20 causes the surface-abutting portion 42 to bear against the inner surface 18 of the wall structure 14. Of course, as explained hereinbelow the pot 20 may be released from the opening 12 in the wall structure 14 by unscrewing the fastener 24.

The clip 22 may be modified so as to be provided with a surface-abutting portion 42 presenting a different angle than what is illustrated with reference to FIGS. 1 and 3-5 while being partially-extended from the aperture 38 depending on the general resilience of the clip 22 while mounted to the pot 20.

Turning now to FIGS. 6 to 13 of the appended drawings, a recessed electrical equipment fixture 100 according to a second embodiment of the present invention will be described.

The fixture 100 includes a pot 102 better seen in FIG. 8, a clip 104 better seen in FIG. 9 and a fastener 106 for securing the clip 104 to the pot 102.

As can be better seen from FIG. 8, the pot 102 includes a peripheral wall 108, an end wall 110 provided with an opening 112 and a peripheral flange 114. The pot 102 also includes a clip receiving means in the form of a slot structure including a first inverted T-slot 116, defined by a longitudinal slot 118 and a transversal slot 120, and a cross-shaped slot 122, defined by a longitudinal slot 124 and a non-regular transversal slot 126. More specifically, the intersection between the longitudinal slot 124 and transversal slot 126 defines a tapered section 127 of the cross-shaped slot 122.

The clip 104 (FIG. 9) is in the form of a bended generally flat elongated body including a fastener-receiving portion 128, a surface-abutting portion 130 and an intermediate portion 132 for slidably mounting the clip 104 to the peripheral surface 108 of the pot 102 via the clip-receiving means.

The fastener-receiving portion 128 includes a threaded aperture 134 configured to threadingly receive the fastener 106.

The surface-abutting portion 130 is generally flat and defines an obtuse angle with respect to the intermediate portion 132. The surface-abutting portion 130 is connected to the intermediate portion 132 via a narrower section 136 defining two shoulders 138.

The intermediate portion 132 includes a clip mounting portion in the form of a generally T-shaped section 140 adjacent to the fastener-receiving portion 128, a narrow section 142 adjacent generally T-shaped section 140, a wide section 144 provided with a folded tab 146 and located between the narrow section 142 and the surface-abutting portion 130.

Figure 10:
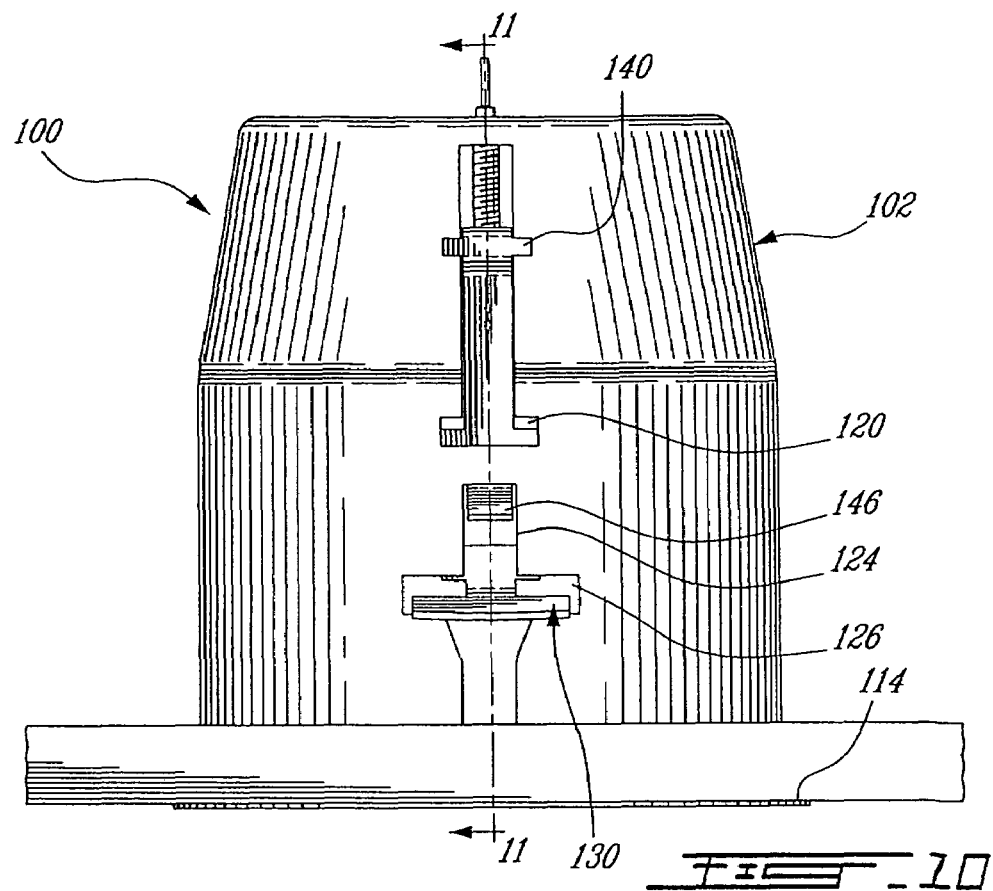
FIG. 10 is an elevation of the recessed fixture of FIG. 1, illustrating the clip partially extended.
Figure 11:
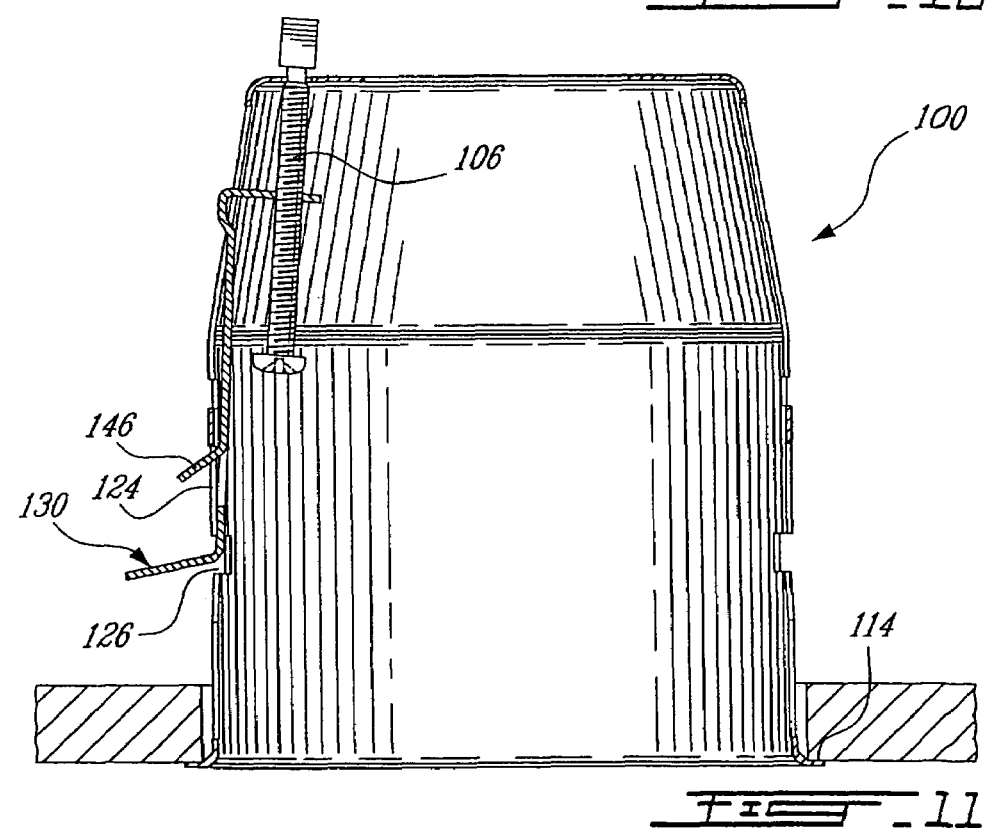
FIG. 11 is a cross-section taken along line 11-11 of FIG. 10.

As can be better seen from FIGS. 10 and 11, the transversal slot 120 is so sized to allow passage of the T-shaped section 140 therethrough. Similarly, the transversal slot 126 is so sized that the surface-abutting portion 130 may pass therethrough. The folded flap 146 is configured and sized so as to fit in the longitudinal slot 124 to thereby help the clip 104 to maintain its longitudinal attitude.

The tapered section 127 of the cross-shaped slot 122 allows contributing to the automatic insertion of the narrower section 136 into the portion of the longitudinal slot 124 located below the transversal slot 126 when the clip moves from a retracted position to a clipping position or its automatic withdrawal when it moves in the opposite direction.

FIGS. 6 and 7 of the appended drawings illustrate the fixture 100 where the clip 104 is in a fully retracted position. As can be better seen from FIG. 7, when the clip 104 is in this position, the surface-abutting portion 130 is fully enclosed in the pot 102.

To move the clip 104 from its fully retracted position towards a clipping position where the surface-abutting position abuts the inner surface 18 of the wall structure 12, one simply has to rotate the fastener 106 clockwise to thereby move the clip 104 in the direction of arrow 148.

FIGS. 10 and 11 illustrate the fixture 100 when the clip 104 is in an intermediary semi-extended position. As better seen from FIG. 11, the fact that the clip 104 is mounted to the peripheral wall 108 of the pot 102 and that its surface-abutting portion 130 extends from the intermediary portion 132 towards the peripheral wall 108, the surface-abutting portion 130 is forced through the transversal slot 126 by the fastener 106, which acts as a lever. In this configuration, the folded tab 146 is inserted in the longitudinal slot 124.

Figure 12:
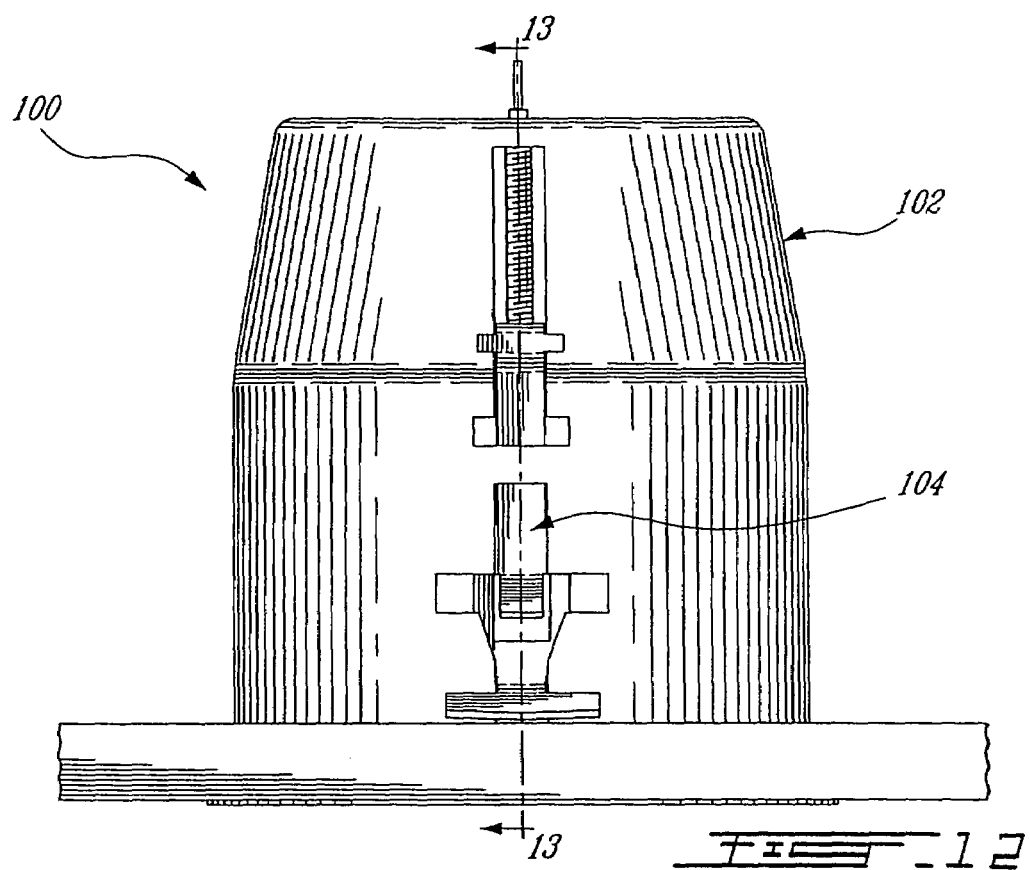
FIG. 12 is an elevation of the recessed fixture of FIG. 6, illustrating the clip partially extended.
Figure 13:
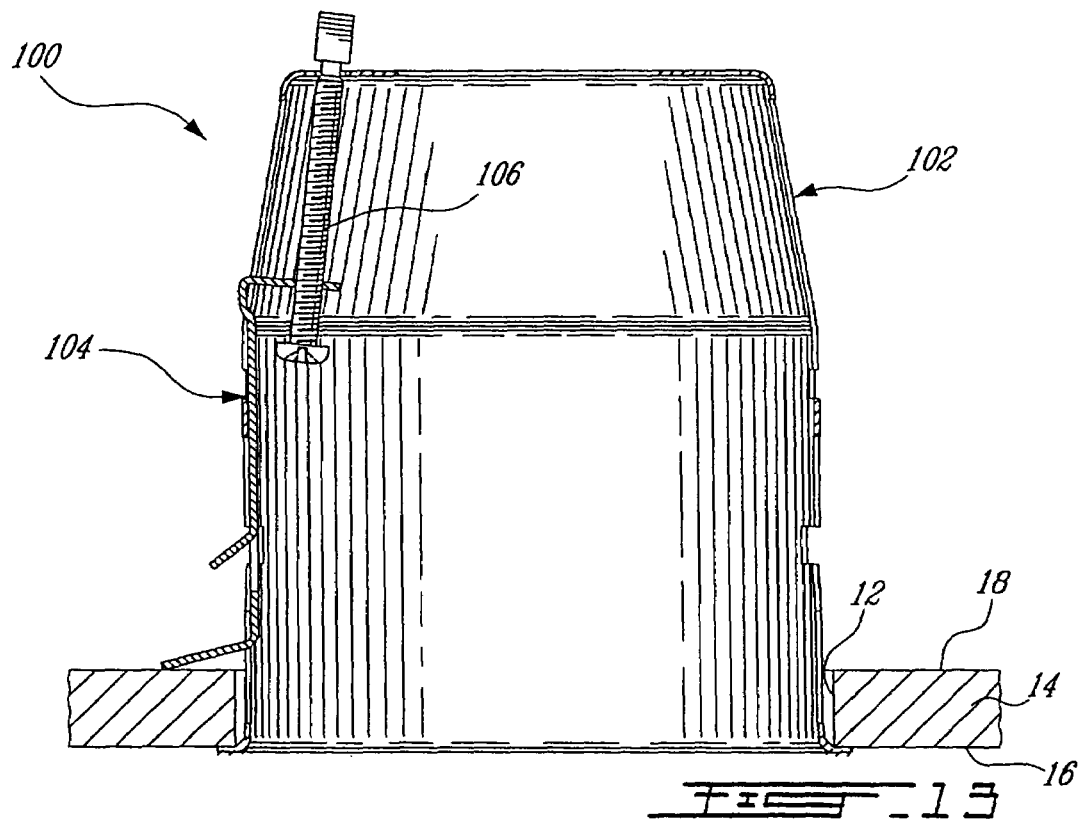
FIG. 13 is a cross-section taken along line 13-13 of FIG. 12.

Finally, FIGS. 12 and 13 illustrate the fixture 100 when the clip 104 is in its clipping position. To reach this clipping position the fastener 106 is rotated clockwise.

As mentioned hereinabove, one skilled in the art will appreciate that the movement of the clip from its fully retracted position illustrated in FIG. 6 to its fully extended position illustrated in FIG. 12 was achieved solely by the rotation of the fastener 104. Furthermore, should the fastener 106 be rotated in a counter-clockwise direction, the clip 104 would move back to its fully retracted position where the surface-abutting portion 130 is located inside the pot 102, allowing the removal of the pot 102 from the aperture.

Even though, the present invention has been illustrated as including fasteners 24 or 106 which are pre-mounted to the clips 22 or 104 respectively and rotatably secured to the pot 20 or 102 respectively, the fasteners 24 or 106 can alternatively be initially secured only to the clips 22 or 104 before being installed to the pot 20 or 102 or be provided separately from both the clip and the pot. In both cases, the clip 22 or 104 is moved between the retracted and clipping positions by rotating the fastener 24 or 106, which is received in the aperture of the clip 22 or 104, while a force is exerted on the fastener to ensure it contacts the end wall of the pot during rotation. Of course, in such cases, an aperture is not provided in the end wall of the pot for receiving the fastener. A cavity may however be provided in the end wall of the pot for receiving the tip of the fastener to help prevent slippage of the fastener during the operation.

It is to be noted that many modifications may be done to the illustrative embodiments described hereinabove and illustrated herein. As non-limiting examples, the type and number of fasteners used, the method of securing the fasteners to the pot, the overall shape of the pot and the configuration and number of slots therein could be modified without departing from the present invention. It is also to be noted that while recessed pots as described hereinabove are often used to mount recessed light fixtures to ceilings, it can also be used to mount electrical outlets and other electrical components to walls.

Although the present invention has been described hereinabove by way of preferred embodiments thereof, it can be modified, without departing from the spirit and nature of the subject invention as defined in the appended claims.

What is claimed is:

1. A recessed fixture for mounting into an opening in a wall structure defining front and rear wall surfaces, the fixture comprising:
   a pot provided with a peripheral wall, an end wall at one longitudinal end of the peripheral wall, and a peripheral flange at the other end thereof for abutment with the front wall surface of the wall structure, the peripheral wall including a generally transversal slot and a generally longitudinal slot extending between the end wall and the peripheral flange and defining a longitudinal axis intersecting the transversal slot; a clip having a first longitudinal end defining a fastener-receiving portion, a second longitudinal end defining a surface-abutting portion and an intermediate portion provided between the first and second longitudinal ends; the intermediate portion including a clip-mounting portion protruding outside of the pot through the longitudinal slot; a fastener having a first end defining a fixture mounting portion so mounted to an aperture of the end wall of the pot as to freely rotate therein, a second end defining a tool receiving portion and an intermediate threaded portion engaged in the fastener-receiving portion of the clip; wherein, a) the fastener, the first longitudinal end and the intermediate portion of the clip are substantially provided inside the pot; b) rotation of the fastener is converted into longitudinal translation of the clip between a retracted position where the surface-abutting portion is contained inside the pot and an extended position where the surface-abutting portion extends from the pot through the generally transversal slot of the peripheral wall.

2. A recessed fixture as recited in claim 1, wherein the clip-mounting portion defines a T-shaped section configured and sized as to be associated with the generally longitudinal slot.

3. A recessed fixture as recited in claim 2, wherein the intermediate portion of the clip further includes a folded tab so sized as to slide in the generally longitudinal slot.

4. A recessed fixture as recited in claim 1, wherein the surface-abutting portion defines an obtuse angle with the intermediate portion of the clip.

5. A clip assembly as recited in claim 4, wherein the surface abutting portion of the clip is integrally connected to the intermediate portion of the clip via a narrower section.

6. A clip assembly as recited in claim 1, wherein the clip-mounting portion is provided in the vicinity of the fastener-receiving portion.

7. A recessed fixture for mounting into an opening in a wall structure defining front and rear wall surfaces, the fixture comprising:

a pot so configured and sized as to be received in the opening of the wall structure and having a peripheral wall, an end wall at one longitudinal end of the peripheral wall, and a peripheral flange at the other end thereof for abutment with the front wall surface of the wall structure; the peripheral wall including a generally transversal slot and a generally longitudinal slot extending between the end wall and the peripheral flange and defining a longitudinal axis intersecting transversal slot; the pot defining a fixture chamber;

a clip generally positioned inside the fixture chamber and having a first longitudinal end defining a fastener-receiving portion, a second longitudinal end defining a surface-abutting portion and an intermediate portion provided between the first and second longitudinal ends; the intermediate portion including a clip-mounting portion protruding outside of the pot through the longitudinal slot; the clip mounting portion including a T-shaped section configured and sized as to engage the generally longitudinal slot; and a fastener having a first end defining a fixture mounting portion mounted to an aperture of the end wall of the pot so as to freely rotate therein, a second end defining a tool receiving portion and an intermediate threaded portion engaged in the fastener-receiving portion of the clip; whereby rotation of the fastener is converted into longitudinal translation of the clip between a retracted position where the surface-abutting portion is contained inside the fixture chamber and an extended position where the surface-abutting portion extends from the fixture chamber through the generally transversal slot of the peripheral wall.

8. A recessed fixture as recited in claim 7, wherein the intermediate portion of the clip includes a folded tab configured and sized as to ride inside the generally longitudinal slot of the pot.

9. A recessed fixture as recited in claim 7, wherein the clip being so mounted to the pot via both the fastener and the clip-mounting portion so as to yield a force biasing the surface-abutting portion towards the peripheral wall of the pot; whereby the surface-abutting portion is biased through the generally transversal slot when the surface-abutting portion is positioned longitudinally adjacent the generally transversal slot by the fastener.

10. A recessed fixture as recited in claim 7, wherein said pot is configured and sized as to receive a light fixture.

11. A recessed fixture as recited in claim 7, wherein the surface abutting portion of the clip is integrally connected to the intermediate portion of the clip via a narrower section.

12. A clip assembly as recited in claim 7, wherein the clip-mounting portion is provided in the vicinity of the fastener-receiving portion.

13. A recessed fixture as recited in claim 11, wherein an intersection of the longitudinal and transversal slots defines a tapered section for further contributing to the guidance of the surface-abutting portion of the clip through the generally transversal slot.

14. A recessed fixture for mounting into an opening in a wall structure defining front and rear wall surfaces, the fixture comprising:

a pot so configured and sized as to be received in the opening of the wall structure and having a peripheral wall provided with a generally transversal slot, an end wall at one longitudinal end of the peripheral wall, and a peripheral flange at the other end thereof for abutment with the front wall surface of the wall structure; the pot defining a fixture chamber;

a clip generally positioned inside the fixture chamber and having first end defining a fastener-receiving portion, a second end defining a surface-abutting portion and an intermediate portion provided between the fastener-receiving portion and the surface-abutting portion; the intermediate portion being so mounted to the peripheral wall inside the fixture chamber as to allow the clip to longitudinally reciprocate between a retracted position where the surface abutting portion is contained in the fixture chamber and an extended position where the surface-abutting portion extends outside the fixture chamber through the generally transversal slot; the intermediate portion of the clip including a clip-mounting portion mounting the clip to the peripheral wall of the pot: the surface-abutting portion defining an obtuse angle with the intermediate portion of the clip: the clip-mounting portion and the fastener being so configured as to bias the surface-abutting portion towards the peripheral wall; and a fastener mounted inside the pot between the end wall of the pot and the fastener-receiving portion of the clip to reciprocatively move the clip between the retracted position and the extended position; the fastener being so mounted to the end wall of the pot as to freely rotate therefrom and being threadedly engaged to the fastener receiving portion of the clip.

15. A recessed fixture as recited in claim 14, wherein the peripheral wall of the pot includes a generally longitudinal slot for receiving the clip-mounting portion of the clip for free movement therein.

16. A recessed fixture as recited in claim 15, wherein the clip-mounting portion includes a T-shaped section so configured and sized as to engage the generally longitudinal slot.

17. A recessed fixture as recited in claim 15, wherein the clip-mounting portion includes a folded tab so configured and sized as to ride inside the generally longitudinal slot of the pot.

18. A recessed fixture as recited in claim 15, wherein an intersection of the longitudinal and transversal slots defines a tapered section for further contributing to guiding said surface-abutting portion of the clip through the generally transversal slot.

19. A recessed fixture as recited in claim 14, wherein the pot is configured and sized as to receive a light fixture.

* * * * *